US008637147B2

(12) United States Patent
Tsukahara et al.

(10) Patent No.: US 8,637,147 B2
(45) Date of Patent: *Jan. 28, 2014

(54) BARRIER LAMINATE, GAS BARRIER FILM AND DEVICE USING THE SAME

(75) Inventors: Jiro Tsukahara, Kanagawa (JP); Shigehide Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1021 days.

This patent is subject to a terminal disclaimer.

(21) Appl. No.: 12/491,842

(22) Filed: Jun. 25, 2009

(65) Prior Publication Data

US 2009/0324942 A1 Dec. 31, 2009

(30) Foreign Application Priority Data

Jun. 26, 2008 (JP) ................................ 2008-167146

(51) Int. Cl.
*B32B 18/00* (2006.01)
*B32B 27/06* (2006.01)
*B32B 27/30* (2006.01)

(52) U.S. Cl.
USPC ........... 428/336; 428/332; 428/334; 428/522; 428/698; 428/702

(58) Field of Classification Search
None
See application file for complete search history.

(56) References Cited

U.S. PATENT DOCUMENTS

| 7,955,700 | B2 | 6/2011 | Agata |
| 2006/0093758 | A1 | 5/2006 | Sakakura et al. |
| 2007/0020451 | A1* | 1/2007 | Padiyath et al. ............... 428/336 |
| 2007/0059491 | A1 | 3/2007 | Kawashima et al. |
| 2007/0231592 | A1 | 10/2007 | Agata |
| 2008/0081205 | A1 | 4/2008 | Agata et al. |
| 2009/0258235 | A1* | 10/2009 | Tateishi ........................ 428/413 |

FOREIGN PATENT DOCUMENTS

| EP | 0475628 A1 | 3/1992 |
| EP | 1842873 A1 | 10/2007 |
| EP | 2 110 403 A1 | 10/2009 |
| EP | 2 128 191 A1 | 12/2009 |
| JP | 08165368 A * | 6/1996 |
| JP | 2003-118046 A | 4/2003 |
| JP | 2004-174713 | 6/2004 |
| JP | 2004-174713 A | 6/2004 |
| JP | 2004-244606 | 9/2004 |
| JP | 2004-244606 A | 9/2004 |
| JP | 2005-96108 A | 4/2005 |
| JP | 2007038445 A * | 2/2007 |
| JP | 2007-290369 A | 11/2007 |
| JP | 2008-74085 A | 4/2008 |
| WO | WO 2005/033061 A1 | 4/2005 |
| WO | WO 2005/110741 A1 | 11/2005 |
| WO | WO-2005/110741 A1 | 11/2005 |
| WO | WO 2008/112452 A2 | 9/2008 |

OTHER PUBLICATIONS

Database WPI Week 200449, Thomson Scientific, London, GB; AN 2004-510695; XP-002549672, Sep. 2, 2004.
Database WPI Week 200459 Thomson Scientific, London, GB; AN 2004-609626; XP-002549639, Jun. 24, 2004.
European Office Action—22-10-09.
Kubo et al.; Database Caplus Chemical Abstracts Service, Sep. 2, 2004; Transparent multilayer vapor-barrier films and electroluminescent displays using them; abstract.
Extended European Search Report, dated Aug. 20, 2009, for European Application No. 09007226.5.
US Office Action, dated Feb. 29, 2012, for U.S. Appl. No. 12/474,758.
Eguchi et al., "Optical film sheet for electroluminescent display device has preset depth in which there are no holes with respect to average line . . . ", Database WPI, Week 200449, Thomson Scientific, AN: 2004-510695, XP-002549639, Jun. 24, 2004, Abstract only.
Extended European Search Report, dated Oct. 22, 2009, for European Application No. 09008387.4.
Ito et al., "Transparent barrier film for e.g. broad optical unit, electronics unit, general packaging unit has water vapor permeability . . . ", Database WPI, Week 200459, Thompson Scientific, AN: 2004-609626, XP-002549672, Sep. 2, 2004, Abstract only.
Kubo et al., "Optical multilayer plastic film sheet and electroluminescent display device using the sheet," Database Caplus Chemical Abstract Service, Sep. 2, 2004, Abstract only.
European Office Action dated May 22, 2012, issued in corresponding European Patent Application No. 09 008 387.4.
Advisory Action, dated Oct. 11, 2012, for U.S. Appl. No. 12/474,758.
US Office Action, dated Jul. 2, 2012, for U.S. Appl. No. 12/474,758.
US Office Action, dated Jul. 30, 2013, for U.S. Appl. No. 12/474,758.
Japanese Office Action dated Dec. 4, 2012 issued in corresponding Japanese Patent application No. 2009-148484 (English translation is attached).
Japanese Office Action dated Dec. 4, 2012 issued in Japanese Patent application No. 2009-129611 (English translation is attached), which corresponds to U.S. Appl. No. 12/474,758.

* cited by examiner

*Primary Examiner* — Monique Jackson
(74) *Attorney, Agent, or Firm* — Birch, Stewart, Kolasch & Birch, LLP

(57) ABSTRACT

Disclosed is a barrier laminate comprising at least one organic layer and at least one inorganic layer, wherein the organic layer has a thickness of 300 nm to 900 nm and is formed by curing a polymerizable composition comprising an aromatic (meth)acrylate and a multifunctional (meth)acrylate having an acryl equivalent weight of not more than 200.

18 Claims, No Drawings

BARRIER LAMINATE, GAS BARRIER FILM AND DEVICE USING THE SAME

FIELD OF THE INVENTION

The present invention relates to a barrier laminate, a gas barrier film, and a device using the barrier laminate or the gas barrier film. The present invention also relates to a method for producing a barrier laminate.

DESCRIPTION OF THE RELATED ART

Heretofore, a gas barrier film in which a thin film comprising a metal oxide such as aluminum oxide, magnesium oxide and silicon oxide is formed on a surface of a plastic film is widely used for a package of articles which requires to be shut out from various gases such as vapor and oxygen and for a package to prevent industrial goods, medical products and the like from changing in their qualities.

In the recent years, in the field of a liquid crystal display device and an organic EL device, plastic film substrates start to replace glass substrates, which are heavy and easily broken. Since such plastic film substrates are applicable to a Roll to Roll system, its cost is advantageous. However, such plastic film substrates have a problem in that the plastic film substrate is poorer in moisture vapor barrier property than glass substrates. Therefore, when the plastic film is used for a liquid crystal display device, moisture vapor infiltrate into the liquid crystal cell, causing its display failure.

In order to solve this problem, U.S. Pat. No. 6,413,645 discloses the technique realizing less than 0.005 g/m$^2$/day of the vapor permeability by using an alternate layer constitution comprising several organic layers and inorganic layers as a barrier layer. The specification discloses that, when only one organic layer and one inorganic layer are laminated, its vapor permeability is 0.011 g/m$^2$/day, and that the multi-layers laminate is technically valuable.

JP-A-8-165368 discloses a transparent conductive film in which a bisphenol A-type epoxyacrylate is used in an organic layer.

SUMMARY OF THE INVENTION

However, since multi-layers laminate of organic layers and inorganic layers such as described in U.S. Pat. No. 6,413,645 lowers its productivity, it may become a major problem when the gas barrier film is supplied in a large amount in view of the industrial availability. In order to produce the gas barrier film in low cost, it is required that the gas barrier film expresses high barrier property in as small number of layers as possible. From those, it is desired to develop an organic inorganic laminate which achieves not more than 0.005 g/m$^2$/day of the vapor permeability, especially less than 0.001 g/m$^2$/day, even if the laminate has only one combination of one organic layer and one inorganic layer, a gas barrier film having the organic inorganic laminate, and an organic EL device having the gas barrier film.

The inventors assiduously have studied JP-A-8-165368, and then have assumed that a transparent conductive film such as a film disclosed in the Example of JP-A-8-165368 is poor in barrier property from the viewpoint of recent requirement of higher barrier property.

The object of the present intention is to solve the above problem, and to provide a gas barrier laminate having high barrier property.

Given the situation as above, the inventors have assiduously studied and have found that JP-A-8-165368 cause reduced barrier property by setting a thickness of an organic layer to around 4.0 µm. As a result of further study, they have found that barrier property is enhanced by thinning a thickness of an organic layer. It is extremely amazing that barrier property is enhanced by thinning a thickness of a layer.

In addition, the inventors have found that barrier property can be extremely enhanced by using a specific aromatic compound and a multifunctional (meth)acrylate having a low acryl equivalent weight as a material of at least one organic layer.

Specifically, the aforementioned problem can be solved by the following means.

[1] A barrier laminate comprising at least one organic layer and at least one inorganic layer, wherein the organic layer has a thickness of 300 nm to 900 nm and is formed by curing a polymerizable composition comprising an aromatic (meth)acrylate represented by the following formula (1) and a multifunctional (meth)acrylate having a low acryl equivalent weight, especially an acryl equivalent weight of not more than 200:

formula (1)

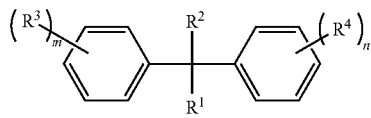

wherein $R^1$ and $R^2$ each are a hydrogen atom, an alkyl group, or an aryl group, $R^1$ and $R^2$ may bond with each other to form a ring; $R^3$ and $R^4$ each are a substituent; m and n each are an integer of 0 to 5; when m is not less than 2, each $R^3$ may be the same or different, and when n is not less than 2, each $R^4$ may be the same or different; and at least two of $R^3$ and $R^4$ have a (meth)acryloyloxy group.

[2] The barrier laminate according to [1], wherein the formula (1) is represented by the following formula (2);

formula (2)

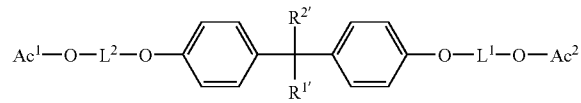

wherein $R^{1'}$ and $R^{2'}$ each are a hydrogen atom, an alkyl group, or an aryl group; $L^1$ and $L^2$ each are a linking group; $Ac^1$ and $Ac^2$ each are an acryloyl group, or a (meth)acryloyl group.

[3] The barrier laminate according to [1] or [2], wherein the multifunctional (meth)acrylate having an acryl equivalent weight of not more than 200 has an acryl equivalent weight of 110 to 180.

[4] The barrier laminate according to any one of [1] to [3], wherein the multifunctional (meth)acrylate having an acryl equivalent weight of not more than 200 has 2 to 6 (meth)acryloyloxy groups.

[5] The barrier laminate according to any one of [1] to [4], wherein the polymerizable composition further comprises an acid monomer.

[6] The barrier laminate according to any one of [1] to [4], wherein the polymerizable composition further comprises a compound represented by the following formula (P):

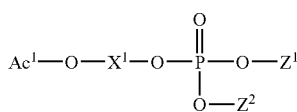

formula (P)

wherein $Z^1$ represents $Ac^2$—O—$X^2$—, a substituent not having a polymerizable group, or a hydrogen atom; $Z^2$ represents $Ac^3$—O—$X^3$—, a substituent not having a polymerizable group, or a hydrogen atom; $Ac^1$, $Ac^2$ and $Ac^3$ each represent an acryloyl group, or a (meth)acryloyl group; $X^1$, $X^2$ and $X^3$ each represent a divalent linking group.

[7] The barrier laminate according to any one of [1] to [4], wherein the polymerizable composition further comprises 5 to 20% by weight of a compound represented by the following formula (P):

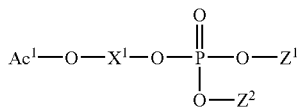

formula (P)

wherein $Z^1$ represents $Ac^2$—O—$X^2$—, a substituent group not having a polymerizable group, or a hydrogen atom; $Z^2$ represents $Ac^3$—O—$X^3$—, a substituent group not having a polymerizable group, or a hydrogen atom; $Ac^1$, $Ac^2$ and $Ac^3$ each represent an acryloyl group or a (meth)acryloyl group; and $X^1$, $X^2$ and $X^3$ each represent a divalent linking group.

[8] The barrier laminate according to any one of [1] to [7], wherein the polymerizable composition comprises 70 to 90% by weight of the aromatic (meth)acrylate represented by the formula (1) and 10 to 30% by weight of the multifunctional (meth)acrylate having an acryl equivalent weight of not more than 200.

[9] The barrier laminate according to any one of [1] to [8], wherein the aromatic (meth)acrylate represented by the formula (1) has a molecular weight of 300 to 1000.

[10] The barrier laminate according to any one of [1] to [9], wherein the inorganic layer comprises an oxide containing aluminium and/or silicon, or a nitride containing aluminium and/or silicon.

[11] The barrier laminate according to any one of [1] to [10], which has a constitution comprising an inorganic layer, an organic layer and an inorganic layer in that order.

[12] The barrier laminate according to any one of [1] to [11], wherein at least two organic layers and at least two inorganic layers are laminated alternately.

[13] A gas barrier film comprising a substrate and the barrier laminate according to any one of [1] to [12].

[14] A device comprising the barrier laminate any according to any one of [1] to [12].

[15] The device according to [14], having the gas barrier film according to [13] as a substrate.

[16] The device according to [14] or [15], sealed up with the gas barrier film according to [13].

[17] The device according to any one of [14] to [16], sealed up with the barrier laminate.

[18] The device according to any one of [14] to [17], which is an electronic device.

[19] The device according to any one of [14] to [17], which is an organic EL device.

[20] A method for producing the barrier laminate according to any one of [1] to [12], comprising the inorganic layer by a sputtering method.

The present invention made it possible to provide a barrier laminate having higher barrier property. Further, the barrier laminate of the present invention has an advantage that its adhesiveness is higher.

DESCRIPTION OF SPECIFIC EMBODIMENTS

The contents of the present invention are described in detail hereinunder. In this description, the numerical range expressed by the wording "a number to another number" means the range that falls between the former number indicating the lowermost limit of the range and the latter number indicating the uppermost limit thereof. "Organic EL device" as referred to herein means an organic electroluminescent device, In addition, "(meth)acrylate" means acrylate and methacrylate in the present specification.

<Barrier Laminate>

The barrier laminate of the present invention is characterized by comprising at least one organic layer and at least one inorganic layer, wherein the organic layer is formed by curing a polymerizable composition comprising an aromatic (meth)acrylate represented by the formula (1) and a multifunctional (meth)acrylate having a low acryl equivalent weight. Using such an organic layer enhances barrier property. The barrier laminate of the present invention preferably has a constitution in which at least two organic layers and at least two inorganic layers are laminated alternately.

(Organic Layer)

The organic layer in the present invention is formed by using an aromatic (meth)acrylate represented by the following formula (1)

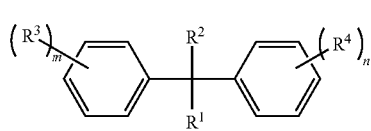

formula (1)

wherein $R^1$ and $R^2$ each are a hydrogen atom, an alkyl group, or an aryl group, $R^1$ and $R^2$ may bond with each other to form a ring; $R^3$ and $R^4$ each are a substituent; m and n are an integer of 0 to 5; when m is not less than 2, each $R^3$ may be the same or different, and when n is not less than 2, each $R^4$ may be the same or different; and at least two of $R^3$ and $R^4$ have a (meth)acryloyloxy group.

$R^1$ and $R^2$ each are a hydrogen atom, an alkyl group, or an aryl group, $R^1$ and $R^2$ may bond with each other to form a ring. The alkyl group is preferably a methyl group. The aryl group is preferably a phenyl group. $R^1$ and $R^2$ each are more preferably a hydrogen atom or an alkyl group. When $R^1$ and $R^2$ are an alkyl group and bond with each other to form a ring, $R^1$ and $R^2$ particularly preferably form a 1,1-cyclohexylidene group. When $R^1$ and $R^2$ are an aryl group and bond with each other to form a ring, the whole of $R^1$ and $R^2$ particularly preferably compose a fluorene ring.

$R^1$ and $R^2$ may have a substituent. Examples of the substituent include an alkyl group (for example, methyl group, ethyl group, isopropyl group, t-butyl group, n-octyl group, n-decyl group, n-hexadecyl group, cyclopropyl group, cyclopentyl group, cyclohexyl group), an alkenyl group (for example, vinyl group, aryl group, 2-butenyl group, 3-pentenyl group), an aryl group (for example, phenyl group, p-methylphenyl, naphthyl group, anthryl group, phenanthryl group, pyrenyl group), a halogen atom (for example, fluorine atom, chlorine atom, bromine atom, iodine atom), an acyl group (for example, acetyl group, benzoyl group, formyl group, pivaloyl group), an acyloxy group (for example, acetoxy group, acryloyloxy group, methacryloyloxy group), an alkoxycarbonyl group (for example, methoxycarbonyl group, ethoxycarbonyl group), an aryloxycarbonyl group (for example, phenyloxycarbonyl group), a sulfinyl group (methanesulfinyl group, benzenesulfinyl group), a heterocyclic group (it preferably has 1 to 12 carbon atoms, includes a nitrogen atom, an oxygen atom, or a sulfur atom as a hetero atom, and may be an aliphatic heterocyclic group, or a heteroaryl group, and examples thereof include imidazolyl group, pyridyl group, quinolyl group, furyl group, thienyl group, piperidyl group, morpholino group, benzoxazolyl group, benzimidazolyl group, benzothiazolyl group, carbazolyl group, azepinyl group). Those substituent may be further substituted.

$R^3$ and $R^4$ each are a substituent. Examples of $R^3$ and $R^4$ include the same substituents as the above-mentioned substituent for $R^1$ and $R^2$.

m and n each are an integer of 0 to 5. When m is not less than 2, each $R^3$ may be the same or different. When n is not less than 2, each $R^4$ may be the same or different At least two of $R^3$ and $R^4$ in the (meth)acrylate represented by the formula (1) have a (meth)acryloyloxy group. Preferably all of $R^3$ and $R^4$ in the (meth)acrylate represented by the formula (1) have a (meth)acryloyloxy group. Examples of a group having a (meth)acryloyloxy group include acryloyloxy group, methacryloyloxy group, 2-acryloyloxyetoxy group, 2-methacryloyloxyetoxy group, 2-hydroxy-3-acryloyloxypropoxy group, 2-hydroxy-3-methacryloyloxypropoxy group, 2-octanoyloxy-3-acryloyloxypropoxy group, 2-heptanoyloxy-3-methacryloyloxypropoxy group, 2,3-bis (acryloyloxy)propoxy group, 2,3-bis(methacryloyloxy)propoxy group.

The aromatic (meth)acrylate represented by the formula (1) is preferably an aromatic (meth)acrylate represented by the following formula (2):

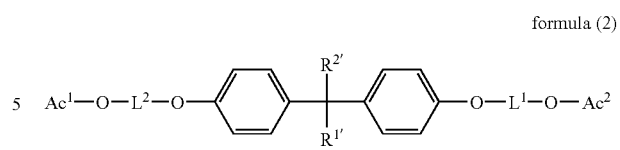

formula (2)

wherein $R^{1'}$ and $R^{2'}$ each are a hydrogen atom, an alkyl group, or an aryl group; $L^1$ and $L^2$ each are a linking group; $Ac^1$ and $Ac^2$ each are an acryloyl group, or a methacryloyl group.

$L^1$ and $L^2$ each are a linking group. Examples thereof include an alkylene group (for example, ethylene group, 1,2-propylene group, 2,2-propylene group (which may be referred as 2,2-propylidene group, or 1,1-dimethylmethylene), 1,3-propylene group, 2,2-dimethyl-1,3-propylene group, 2-butyl-2-ethyl 1,3-propylene group, 1,6-hexylene group, 1,9-nonilene group, 1,12-dodecylene group, 1,16-hexadecylene), an arylene group (for example, phenylene group, naphthylene group), an ether group, an imino group, a carbonyl group, a sulfonyl group, and a divalent residue formed by bonding plurality of those divalent linking groups in series (for example, polyethylene oxyethylene group, polypropylene oxypropylene group, 2,2-propylene phenylene group). $L^1$ and $L^2$ may have a substituent. Examples of the substituent which substitute $L^1$ or $L^2$ include the same groups as the substituent for $R^1$ and $R^2$ as mentioned above. Those substituents further may be substituted. Of those, preferred is an alkylene group, an arylene group, or a divalent group formed by bonding a plurality thereof.

The molecular weight of the aromatic (meth)acrylate represented by the formula (1) is 300 to 1000, preferably 400 to 800. Two or more aromatic (meth)acrylate represented by the formula (1) may be contained in the polymerizable composition. The acryl equivalent weight of the aromatic (meth)acrylate represented by the formula (1) is preferably 180 to 360, more preferably more than 180 to not more than 360, even more preferably 210 to 330.

Specific examples of the aromatic (meth)acrylate represented by the formula (1) are shown below, to which, however, the present invention should not be limited.

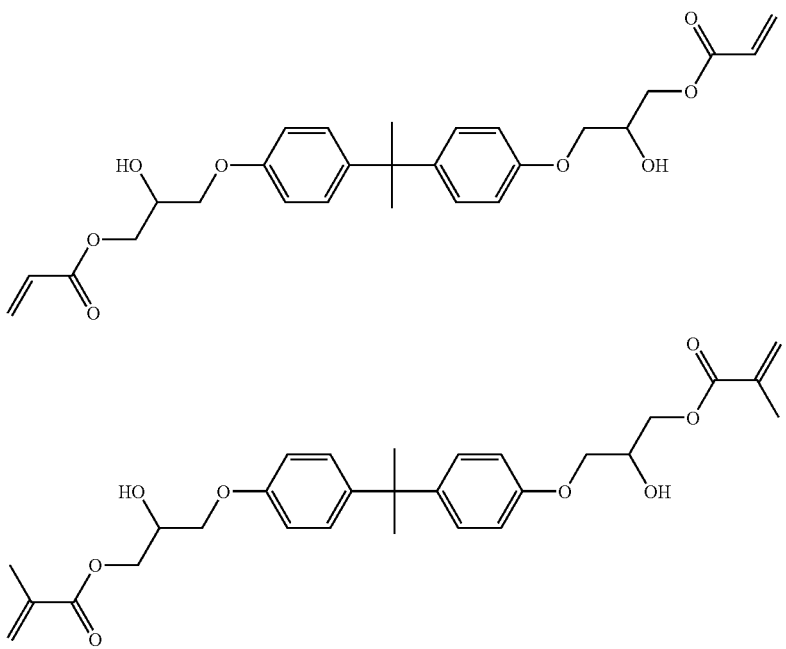

-continued
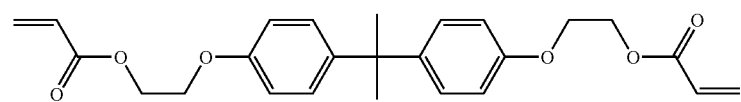
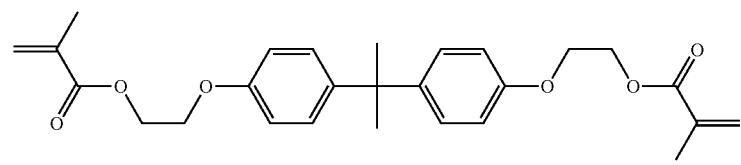
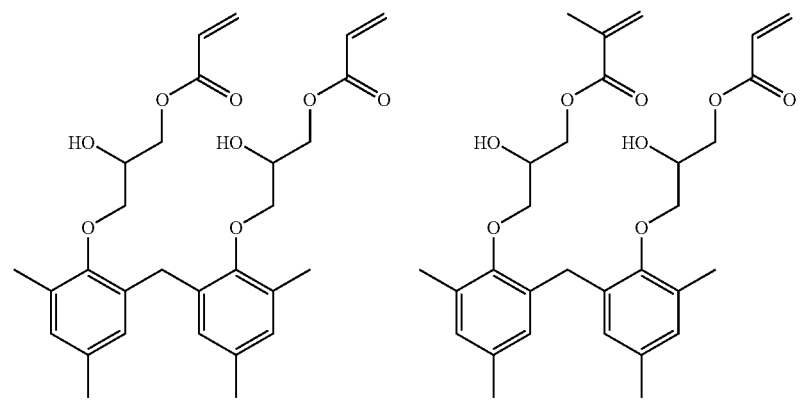
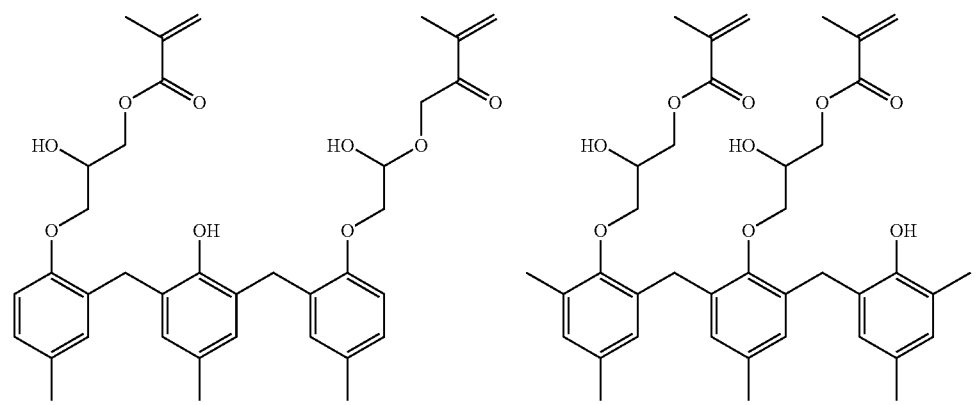
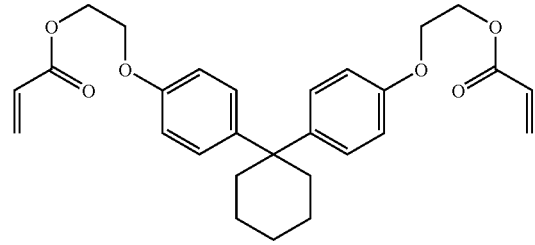
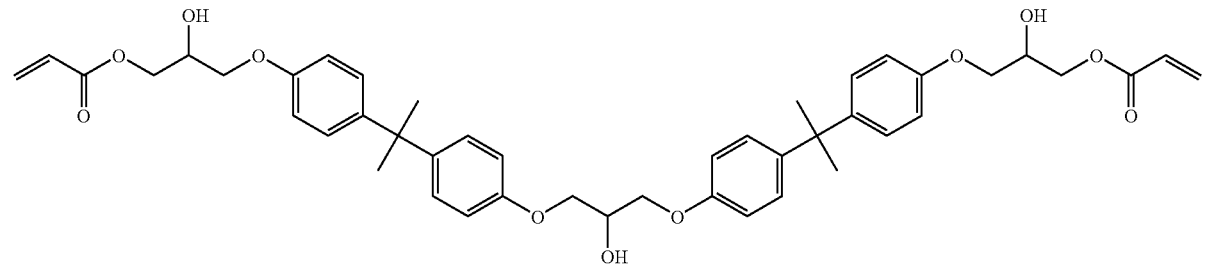

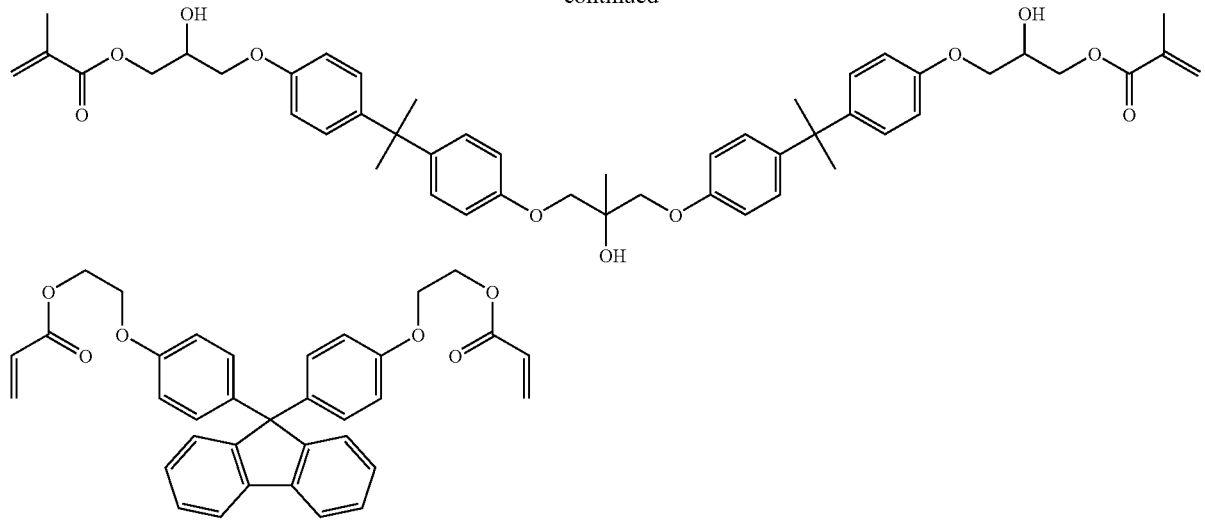

(Multifunctional (Meth)Acrylates Having a Low Acryl Equivalent Weight)

By the investigation of the inventors, it has found that higher barrier property is attained by mixing the aromatic (meth)acrylate represented by the formula (1) with the multifunctional (meth)acrylate having a low acryl equivalent weight than by using only the aromatic (meth)acrylate represented by the formula (1). The low acryl equivalent weight means acryl equivalent weight of not more than 200. All known multifunctional (meth)acrylates having a low acryl equivalent weight may be used in the present invention. The acryl equivalent weight of the multifunctional (meth)acrylates having a low acryl equivalent weight used in the present invention is preferably 110 to 180, more preferably 120 to 180, still more preferably 130 to 170. The acryl equivalent weight is the value calculated by dividing molecular weight of a (meth)acrylate monomer by number of functional groups. The multifunctional (meth)acrylates having a low acryl equivalent weight preferably have 2 to 6 (meth)acryloyloxy groups.

Specific examples of the multifunctional (meth)acrylates having a low acryl equivalent weight are shown below, to which, however, the present invention should not be limited.

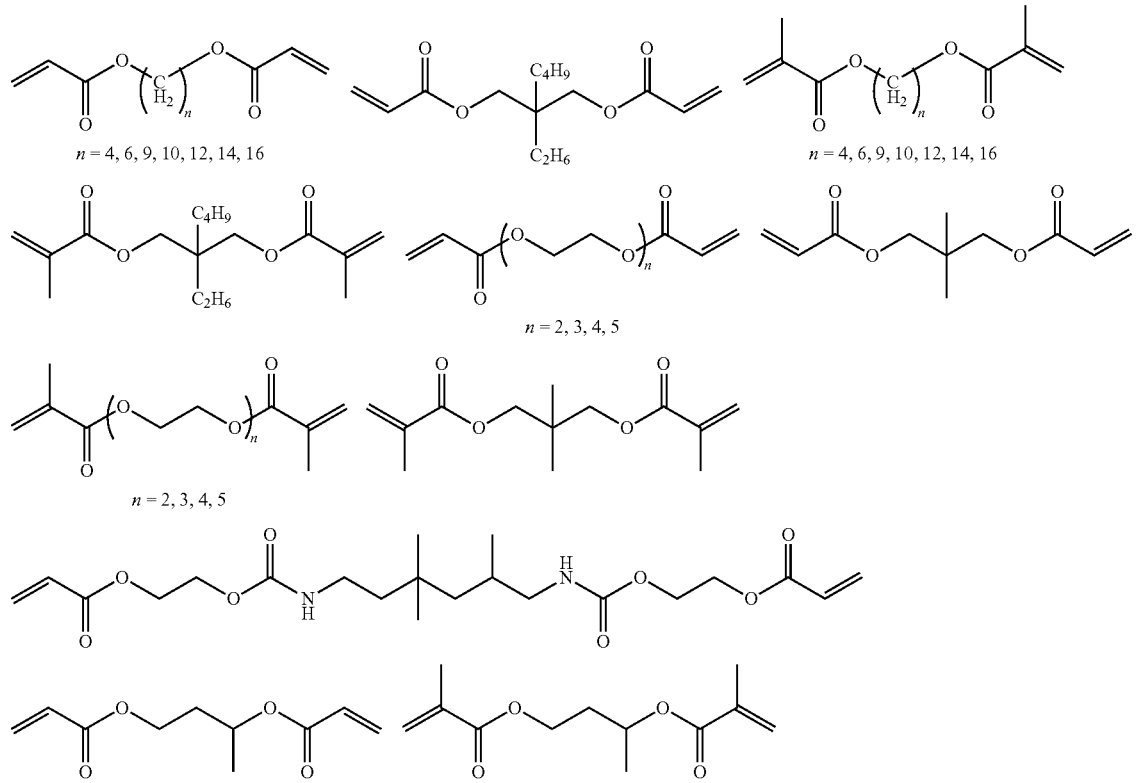

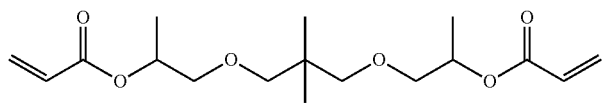
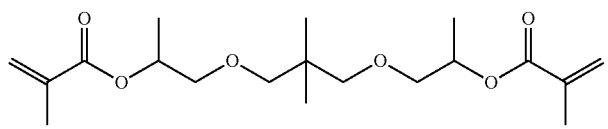
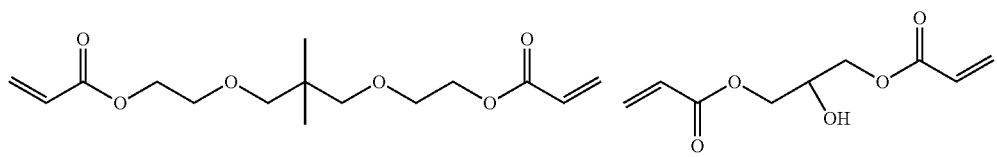
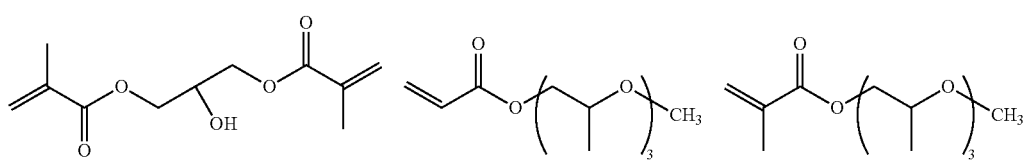
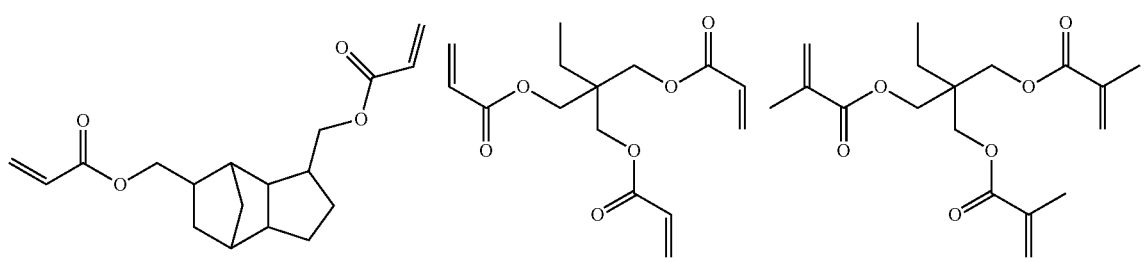
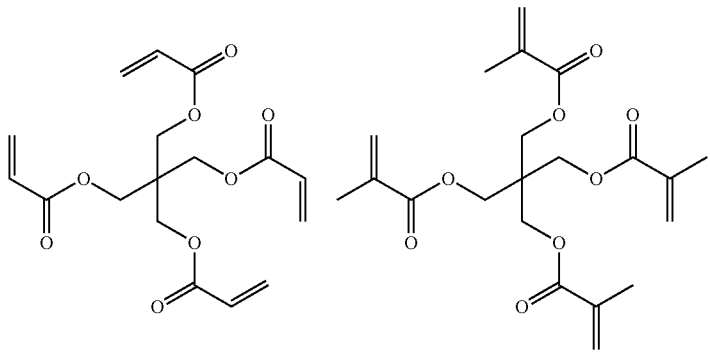
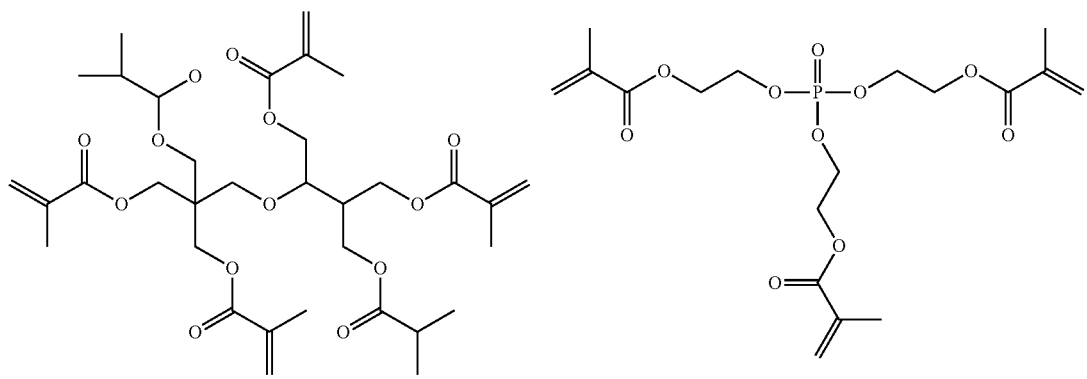

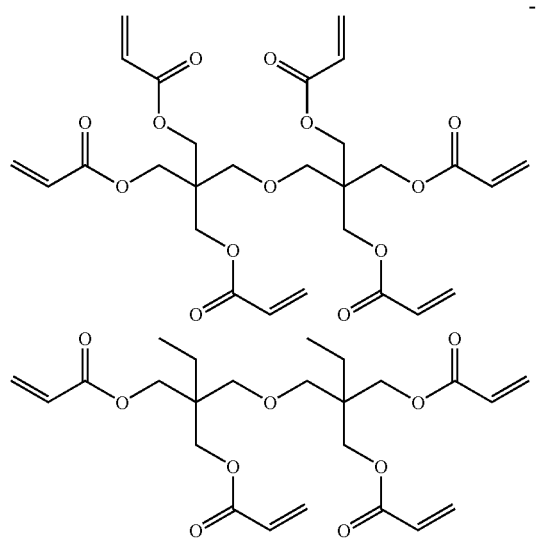
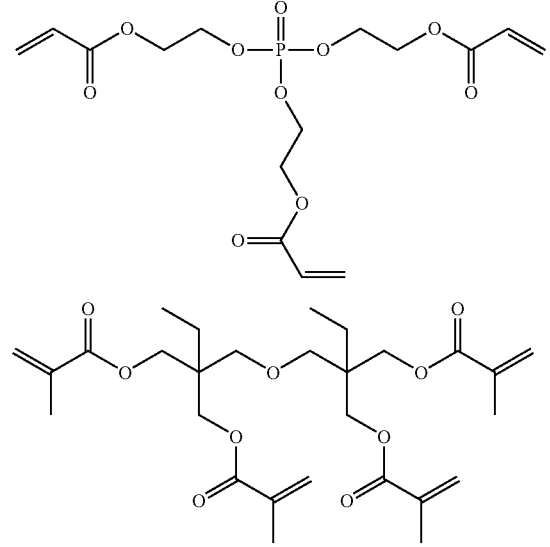

(Acidic Monmers)

The polymerizable composition used in the present invention may comprise an acidic monomer. The inclusion of the acidic monomer enhances adhesiveness between layers. The acidic monomer used in the present invention is preferably monomers having a carbonic acid group or a phosphate group, more preferably (meth)acrylates having a carbonic acid group or a phosphate group, still more preferably (meth)acrylates having a phosphate group.

((Meth)Acrylates Having a Phosphoester Group)

The (meth)acrylate having a phosphate group is preferably a compound represented by the formula (P). The inclusion of the (meth)acrylate compound having a phosphorester group enhances adhesion to the inorganic layer,

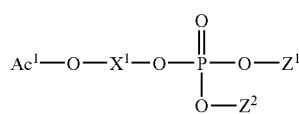

formula (P)

wherein $Z^1$ represents $Ac^2-O-X^2-$, a substituent group not having a polymerizable group, or a hydrogen atom; $Z^2$ represents $Ac^3-O-X^3-$, a substituent group not having a polymerizable group, or a hydrogen atom; $Ac^1$, $Ac^2$ and $Ac^3$ each represent an acryloyl group or a (meth)acryloyl group; and $X^1$, $X^2$ and $X^3$ each represent a divalent linking group.

The compound represented by the formula (P) is preferably a monofunctional monomer represented by the formula (P-1), a bifunctional monomer represented by the formula (P-2), or a trifunctional monomer represented by the formula (P-3):

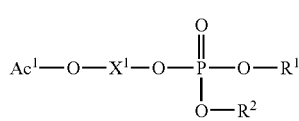

formula (P-1)

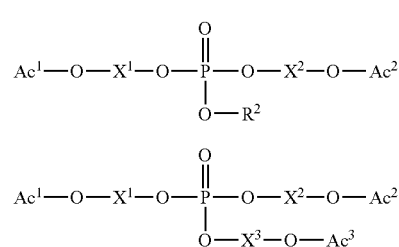

The definitions of $Ac^1$, $Ac^2$, $Ac^3$, $X^1$, $X^2$ and $X^3$ are the same as those in the formula (P). In the formula (P-1) and formula (P-2), $R^1$ represents a substituent not having a polymerizable group or a hydrogen atom, and $R^2$ represents a substituent group not having a polymerizable group, or a hydrogen atom.

In the formula (P), (P-1), (P-2) and (P-3), $X^1$, $X^2$ and $X^3$ each are the same groups as those of $L^1$ in the formula (2), preferably an alkylene group or an alkyleneoxycarbonylalkylene group.

In the formula (P), (P-1), (P-2) and (P-3), examples of the substituent not having a polymerizable group include an alkyl group, an aryl group, and a group consisting of a combination thereof, preferably an alkyl group.

The carbon number of the alkyl group is preferably 1 to 12, more preferably 1 to 9, still more preferably 1 to 6. Examples of the alkyl group include a methyl group, an ethyl group, a propyl group, a butyl group, a pentyl group and a hexyl group. The alkyl group may be a linear, branched, or cyclic group, preferably a linear alkyl group. The alkyl group may be substituted with an alkoxy group, an aryl group, an aryloxy group, or the like.

The carbon number of the aryl group is preferably 6 to 14, more preferably 6 to 10. Examples of the aryl group include a phenyl group, a 1-naphthyl group and a 2-naphtyl group. The aryl group may be substituted with an alkyl group, an alkoxy group, an aryloxy group, or the like.

In the present invention, the monomer represented by the formula (P) may be used singly or as combined. When the compounds are used as combined, may be used a combination comprising two or more kinds of a monofunctional compound represented by the formula (P-1), a bifunctional compound represented by the formula (P-2) and a trifunctional compound represented by the formula (P-3).

In the present invention, as the above polymerizable monomers having a phosphate group, may be used commercially available compounds such as KAYAMER series manufactured by NIPPON KAYAKU CO., LTD, and Phosmer series manufactured by Uni chemical, and a compound newly synthesized.

Specific examples of the (meth)acrylate having a phosphate group, which is preferably used in the present invention, mentioned below, to which, however, the present invention should not be limited.

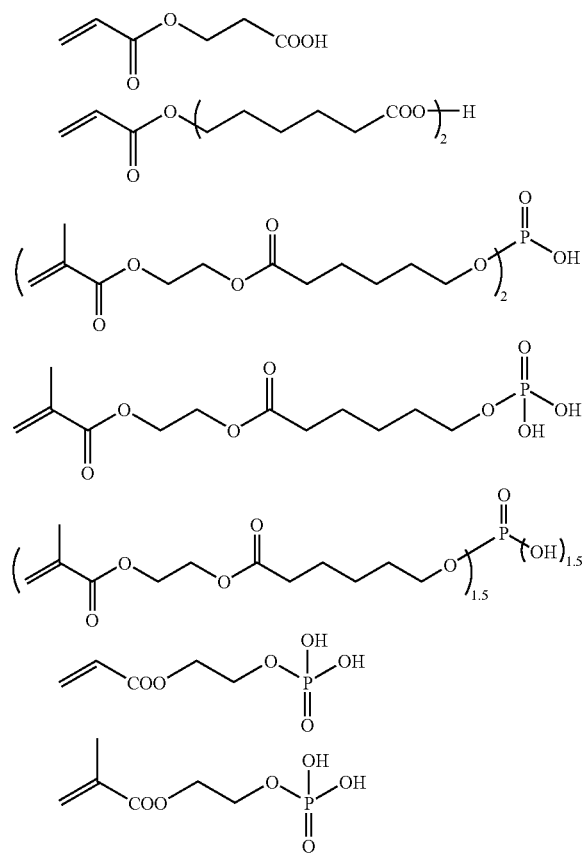

(Other Polymerizable Compounds and Other Polymers)

The polymerizable composition in the present invention may comprise a monomer other than (meth)acrylate (for example, styrene derivatives, maleic anhydrides, epoxy compounds, oxetane derivatives, and the like), or various polymers (for example, polyester resins, methacrylic acid/maleic acid copolymers, polystyrene resins, transparent fluoro-resins, polyimide resins, fluorinated polyimide resins, polyamide resins, polyamidimide resins, polyetherimide resins, cellulose acylate resins, polyurethane resins, polyether ketone resins, polycarbonate resins, alicyclic polyolefin resins, polyarylate resins, polyether sulfone resins, polysulfone resins, fluorene ring-modified polycarbonate resins, alicyclic ring-modified polycarbonate resins and fluorene ring-modified polyesters).

(Composition Ratio)

In the polymerizable composition in the present invention, the mixture ratio of the aromatic (meth)acrylate represented by the formula (1) to the all resin component is preferably 30 to 99% by weight, more preferably 50 to 95% by weight, even more preferably 60 to 90% by weight, still more preferably 70 to 90% by weight.

The mixture ratio of the multifunctional (meth)acrylates having a low acryl equivalent weight to the all resin component of the polymerizable composition is preferably 1 to 70% by weight, more preferably 5 to 50% by weight, even more preferably 10 to 40% by weight, still more preferably 10 to 30% by weight.

The mixture ratio of the acidic monomer to the all resin component of the polymerizable composition is preferably 0 to 30% by weight, more preferably 5 to 20% by weight.

In the polymerizable composition in the present invention, the mixture ratio of polymerizable compounds and polymers other than the aromatic (meth)acrylate represented by the formula (1), the multifunctional (meth)acrylates having a low acryl equivalent weight, and the acidic monomer is preferably not more than 30% by weight to the all resin component, more preferably not more than 20% by weight, still more preferably not more than 10% by weight.

(Combination)

Examples of combination of monomers contained in the polymerizable composition in the present invention are exemplified below, to which, however, the present invention should not be limited.

(a) a combination of an aromatic (meth)acrylate represented by the formula (2), wherein $R^{1'}$ and $R^{2'}$ are an alkyl group and $L^1$ and $L^2$ each an alkylene group having a substituent, and a trifunctional (meth)acrylate.

(b) a combination of an aromatic (meth)acrylate represented by the formula (2), wherein $R^{1'}$ and $R^{2'}$ are an alkyl group and $L^1$ and $L^2$ each an alkylene group or an alkyleneoxyalkylene group, and a hexafunctional (meth)acrylate.

(c) a combination of an aromatic (meth)acrylate represented by the formula (2), wherein $R^{1'}$ and $R^{2'}$ are an alkyl group and $L^1$ and $L^2$ each an alkylene group or an alkyleneoxyalkylene group, a hexafunctional (meth)acrylate and an acidic monomer.

(Polymerization Initiator)

The polymerizable composition in the present invention may include a polymerization initiator. In the case where a photopolymerization initiator is used, its amount is preferably at least 0.1 mol % of the total amount of the polymerizing compound, more preferably from 0.5 to 2 mol %. By setting the thus-designed composition, polymerization reaction though an active ingredient forming reaction may be suitably controlled. Examples of the photopolymerization initiator include Ciba Speciality Chemicals' commercial products, Irgacure series (e.g., Irgacure 651, Irgacure 754, Irgacure 184, Irgacure 2959, Irgacure 907, Irgacure 369, Irgacure 379, Irgacure 819), Darocure series (e.g., Darocure TPO, Darocure 1173), Quantacure PDO; Lamberti's commercial products, Ezacure series (e.g., Ezacure TZM, Ezacure TZT, Ezacure KTO46), etc.

(Method of Formation of Organic Layer)

The method for forming the organic layer is not specifically defined. For example, the layer may be formed according to a solution coating method or a vacuum film formation method. The solution coating method is, for example, a dipping method, an air knife coating method, a curtain coating method, a roller coating method, a wire bar coating method, a gravure coating method, a slide coating method, or an extrusion coating method using a hopper as in U.S. Pat. No. 2,681,294. The vacuum film formation method is not specifically defined, but is preferably a film formation method by vapor deposition or plasma CVD. In the present invention, the polymer may be applied for coating as its solution, or a hybrid coating method along with an inorganic material, as in JP-A 2000-323273 and 2004-25732, may also be used.

In the present invention, the composition comprising the polymerizable monomer is cured by irradiation. The light for irradiation is generally a UV ray from a high-pressure mercury lamp or low-pressure mercury lamp. The radiation energy is preferably at least 0.1 J/cm$^2$, more preferably at least 0.5 J/cm$^2$. (Meth)acrylate series compounds may suffer from interference in polymerization owing to oxygen in air, and therefore, in their polymerization, the oxygen concentration or the oxygen partial pressure is preferably lowered. In the case where the oxygen concentration in polymerization is lowered according to a nitrogen purging method, the oxygen concentration is preferably not more than 2%, more preferably not more than 0.5%. In the case where the oxygen partial pressure in polymerization is lowered by a pressure reduction method, the whole pressure is preferably not more than 1000 Pa, more preferably not more than 100 Pa. Especially preferred is UV polymerization with at least 0.5 J/cm$^2$ energy radiation under a condition of reduced pressure of not more than 100 Pa.

Preferably, the rate of polymerization of monomer is mot less than 85%, more preferably not less than 88%, even more preferably not less than 90%, still more preferably not less than 92%. The rate of polymerization as referred to herein means the ratio of the reacted polymerizable group to all the polymerizing group (acryloyl group and methacryloyl group) in the monomer mixture. The rate of polymerization may be quantitatively determined according to IR absorptiometry.

The thickness of the organic layer is 300 nm to 900 nm, preferably 400 nm to 800 nm. By setting such a range, the barrier property is enhanced, and further the adhesiveness is enhanced.

As so mentioned in the above, the organic layer is preferably smooth. The mean roughness (Ra) at 1 μm square is preferably not more than 1 nm, more preferably not more than 0.5 nm. The surface of the organic layer is required not to have impurities and projections such as particles. Accordingly, it is desirable that the organic layer is formed in a clean room. The degree of cleanness is preferably not more than class 10000, more preferably not more than class 1000.

Preferably, the hardness of the organic layer is higher. It is known that, when the hardness of the organic layer is high, then the inorganic layer may be formed smoothly and, as a result, the barrier level of the gas barrier film is thereby improved. The hardness of the organic layer may be expressed as a microhardness based on a nano-indentation method. The microhardness of the organic layer is preferably at least 100 N/mm, more preferably at least 120 N/mm, further more preferably at least 150 N/mm.

(Inorganic Layer)

The inorganic layer is, in general, a layer of a thin film formed of a metal compound. For forming the inorganic layer, employable is any method capable of producing the intended thin film. For it, for example, suitable are physical vapor deposition methods (PVD) such as vapor evaporation method, sputtering method, ion plating method; various chemical vapor deposition methods (CVD); liquid phase growth methods such as plating or sol-gel method. Not specifically defined, the component to be in the inorganic layer may be any one satisfies the above-mentioned requirements. For example, it includes metal oxides, metal nitrides, a metal carbide, a metal oxide-nitride, or a metal oxide-carbide. Preferably used are oxides, nitrides, carbide oxide-nitrides, or oxide-carbides comprising at least one metal selected from Si, Al, In, Sn, Zn, Ti, Cu, Ce and Ta. Of those, preferred are oxides, nitrides carbide oxide-nitrides, or oxide-carbides of a metal selected from Si, Al, In, Sn, Zn and Ti; more preferred are metal oxides, nitrides or oxide-nitrides with Si or Al. These may contain any other element as a subsidiary component.

Preferably, the surface smoothness of the inorganic layer formed in the present invention is less than 1 nm in terms of the mean roughness (Ra value) in 1 μm square, more preferably not more than 0.5 nm. Accordingly, it is desirable that the inorganic layer is formed in a clean room. Preferably, the degree of cleanness is not more than class 10000, more preferably not more than class 1000.

Not specifically defined, the thickness of the inorganic layer is generally within a range of from 5 to 500 nm/layer, preferably from 10 to 200 nm/layer. The inorganic layer may be composed of two or more sub-layers. In the case, each sub-layer may have the same composition, or different composition. In addition, as so mentioned hereinabove and as disclosed in UP Laid-Open 2004-46497, the inorganic layers may be gradation layers of which the composition changes continuously in the thickness direction of the layer, with no definite boundary to the adjacent inorganic layer.

(Lamination of Organic Layer and Inorganic Layer)

The organic layer and the inorganic layer may be laminated by repeated film formation to form the organic layer and the inorganic layer in a desired layer constitution. In case where the inorganic layer is formed according to a vacuum film formation method such as sputtering method, vacuum evaporation method, ion plating method or plasma CVD method, then it is desirable that the organic layer is also formed according to a vacuum film formation method such as the above-mentioned flash vapor deposition method. While the barrier layer is formed, it is especially desirable that the organic layer and the inorganic layer are laminated all the time in a vacuum of not more than 1000 Pa, not restoring the pressure to an atmospheric pressure during the film formation. More preferably, the pressure is not more than 100 Pa, even more preferably not more than 50 Pa, still more preferably not more than 20 Pa.

Particularly, the barrier laminate of the present invention preferably has a layer constitution comprising an inorganic layer, an organic layer and an inorganic layer, more preferably a layer constitution in which at least two organic layers and at least two inorganic layers are laminated alternately. The alternate layer constitution may be a layer constitution in which an organic layer, an inorganic layer, an organic layer and an inorganic layer are laminated in that order from its substrate site, or a layer constitution in which an inorganic layer, an organic layer, an inorganic layer and an organic layer are laminated in that order from its substrate site.

(Functional Layer)

The device of the present invention may have a functional layer on the barrier laminate or in any other position. The functional layer is described in detail in JP-A 2006-289627, paragraphs 0036 to 0038. Examples of other functional layers than those are a matting agent layer, a protective layer, an antistatic layer, a planarizing layer, an adhesiveness improving layer, a light shielding layer, an antireflection layer, a hard coat layer, a stress relaxing layer, an antifogging layer, an anti-soiling layer, a printable layer, an adhesive layer, etc.

(Use of Barrier Laminate)

In general, the barrier laminate of the present invention is formed on a support. Selecting the support, the barrier laminate may have various applications. The support includes a substrate film, as well as various devices, optical members, etc. Concretely, the barrier laminate of the present invention may be used as a barrier layer of a gas barrier film. The barrier laminate and the gas barrier film of the present invention may be used for sealing up devices that require gas-barrier property. The barrier laminate and the gas barrier film of the present invention may apply optical members. These are described in detail hereinunder.

(Gas Barrier Film)

The gas barrier film comprises a substrate film and a barrier laminate formed on the substrate film. In the gas barrier film, the barrier laminate of the present invention may be provided only one surface of the substrate film, or may be provided on both surfaces thereof. The barrier laminate of the present invention may be laminated in an order of an inorganic layer and an organic layer from the side of the substrate film; or may be laminated in an order of an organic layer and an inorganic layer from it. The uppermost layer of the laminate of the present invention may be an inorganic layer or an organic layer.

The gas barrier film of the present invention is a film substrate having a barrier layer that functions to block oxygen, water, nitrogen oxide, sulfur oxide, ozone and others in air.

Not specifically defined, the number of the layers that constitute the gas barrier film may be typically from 2 layers to 30 layers, more preferably from 3 layers to 20 layers.

The gas barrier film may have any other constitutive components (e.g., functional layers such as adhesive layer) in addition to the barrier laminate and the substrate film. The functional layer may be disposed on the barrier laminate, or between the barrier laminate and the substrate film, or on the side (back) of the substrate film not coated with the barrier laminate.

(Plastic Film)

In the gas barrier film of the present invention, the substrate film is generally a plastic film. Not specifically defined in point of the material and the thickness thereof, the plastic film usable herein may be any one capable of supporting a laminate of an organic layer and an inorganic layer; and it may be suitably selected depending on the use and the object thereof. Concretely, the plastic film includes thermoplastic resins such as polyester resin, methacryl resin, methacrylic acid-maleic anhydride copolymer, polystyrene resin, transparent fluororesin, polyimide, fluoropolyimide resin, polyamide resin, polyamidimide resin, polyetherimide resin, cellulose acylate resin, polyurethane resin, polyether ether ketone resin, polycarbonate resin, alicyclic polyolefin resin, polyarylate resin, polyether sulfone resin, polysulfone resin, cycloolefin copolymer, fluorene ring-modified polycarbonate resin, alicyclic-modified polycarbonate resin, fluorene ring-modified polyester resin, acryloyl compound.

In case where the gas barrier film of the present invention is used as a substrate of a device such as an organic EL device to be mentioned hereinunder, it is desirable that the plastic film is formed of a heat-resistant material. Concretely, the plastic film is preferably formed of a heat-resistant transparent material having a glass transition temperature (Tg) of not lower than 100° C. and/or a linear thermal expansion coefficient of not less than 40 ppm/° C. Tg and the linear expansion coefficient may be controlled by the additives to the material. The thermoplastic resin of the type includes, for example, polyethylene naphthalate (PEN: 120° C.), polycarbonate (PC: 140° C.), alicyclic polyolefin (e.g., Nippon Zeon's Zeonoa 1600: 160° C.), polyarylate (PAr: 210° C.), polyether sulfone (PES: 220° C.), polysulfone (PSF: 190° C.), cycloolefin copolymer (COC, compound described in JP-A 2001-150584: 162° C.), fluorene ring-modified polycarbonate (BCF-PC, compound described in JP-A 2000-227603: 225° C.), alicyclic-modified polycarbonate (IP-PC, compound described in JP-A 2000-227603: 205° C.), acryloyl compound (compound described in JP-A 2002-80616: 300° C. or more) (the parenthesized data are Tg). In particular, for high transparency, use of alicyclic polyolefin is preferred.

In view of the matter that the gas barrier film of the present invention is utilized as a device such as organic EL devices, the plastic film must be transparent, namely its light transmittance is usually not less than 80%, preferably not less than 85%, and more preferably not less than 90%. The light transmittance can be measured by a method described in JIS-K7105, namely by measuring a total light transmittance and an amount of scattered light using an integrating sphere type light transmittance analyzer and subtracting the diffuse transmittance from the total light transmittance.

Even in the case where the gas barrier film of the present invention is used for display use, for example, when it is not disposed on the side of an observer, the transparency is not always required. Accordingly, in such case, an opaque material can also be used as the plastic film. Examples of the opaque material include a known liquid crystal polymer such as polyimides and polyacrylonitrile.

In the case where the gas barrier film of the present invention is used in combination with a polarizing plate, it is preferable that the gas barrier layer surface of the gas barrier film (the surface on which a laminate comprising at least one inorganic layer and at least organic layer is formed) is faced at the inside of a cell and is disposed in the innermost (adjacent to the device). At that time, since the gas barrier film is disposed in the inside of the cell relative to the polarizing plate, a retardation value of the gas barrier film is important. As to a use form of the gas barrier film in such an embodiment, it is preferable that a barrier film using a base material film having a retardation value of not more than 10 nm and a circular polarizing plate ((quarter-wave plate)+(half-wave plate)+(linear polarizing plate)) are laminated and used, or that a linear polarizing plate is combined with a gas barrier film using a base material film having a retardation value of from 100 nm to 180 nm, which can be used as a quarter-wave plate, and used.

Examples of the base material film having a retardation of not more than 10 nm include cellulose triacetate (FUJITAC, manufactured by Fujifilm Corporation), polycarbonates (PURE-ACE, manufactured by Teijin Chemicals Ltd.; and ELMECH, manufactured by Kaneka Corporation), cycloolefin polymers (ARTON, manufactured by JSR Corporation; and ZEONOR, manufactured by Zeon Corporation), cycloolefin copolymers (APEL (pellet), manufactured by Mitsui Chemicals, Inc.; and TOPAS (pellet), manufactured by Polyplastics Co., Ltd.), polyarylates (U100 (pellet), manufactured by Unitika Ltd.) and transparent polyimides (NEOPULIM, manufactured by Mitsubishi Gas Chemical Company). Also, films obtained by properly stretching the foregoing film to adjust it so as to have a desired retardation value can be used as the quarter-wave plate.

The thickness of the plastic film to be used for the gas barrier film of the present invention is properly chosen depending upon the use and therefore, is not particularly limited. It is typically from 1 to 800 µm, and preferably from 10 to 200 µm. These plastic films may have a functional layer such as a transparent conductive layer and a primer layer. The functional layer is described in detail in paragraphs 0036 to 0038 of JP-A-2006-289627 as well as the above-mentioned functional layers.

The vapor permeability at 40° C. 90% RH of the gas barrier film of the present invention is preferably not more than 0.01 g/m$^2$ day, more preferably 0.001 g/m$^2$ day, even more preferably 0.0001 g/m$^2$ day.

(Device)

The barrier laminate and the gas barrier film of the present invention are favorably used for devices that are deteriorated by the chemical components in air (e.g., oxygen, water, nitrogen oxide, sulfur oxide, ozone). Examples of the devices are, for example, organic EL devices, liquid-crystal display devices, thin-film transistors, touch panels, electronic papers, solar cells, other electronic devices. More preferred are organic EL devices.

The barrier laminate of the present invention may be used for film-sealing of devices. Specifically, this is a method of providing a barrier laminate of the present invention on the surface of a device serving as a support by itself. Before providing the barrier laminate, the device may be covered with a protective layer.

The gas barrier film of the present invention may be used as a substrate of a device or as a film for sealing up according to a solid sealing method. The solid sealing method comprises forming a protective layer on a device, then forming an adhesive layer and a gas barrier film as laminated thereon, and curing it. Not specifically defined, the adhesive may be a thermosetting epoxy resin, a photocurable acrylate resin, etc.

(Organic EL Device)

Examples of an organic EL device with a gas barrier film are described in detail in JP-A 2007-30387.

(Liquid-Crystal Display Device)

A reflection-type liquid-crystal display device has a constitution of a lower substrate, a reflection electrode, a lower alignment film, a liquid-crystal layer, an upper alignment film, a transparent electrode, an upper substrate, a λ/4 plate and a polarizing film, formed in that order from the bottom. In this, the gas barrier film of the present invention may be used as the transparent electrode substrate and the upper substrate. In color displays, it is desirable that a color filter layer is additionally provided between the reflection electrode and the lower alignment film, or between the upper alignment film and the transparent electrode. A transmission-type liquid-crystal display device has a constitution of a backlight, a polarizer, a λ/4 plate, a lower transparent electrode, a lower alignment film, a liquid-crystal layer, an upper alignment film, an upper transparent electrode, an upper substrate, a λ/4 plate and a polarizing film, formed in that order from the bottom. In this, the substrate of the present invention may be sued as the upper transparent electrode and the upper substrate. In color displays, it is desirable that a color filter layer is additionally provided between the lower transparent electrode and the lower alignment film, or between the upper alignment film and the transparent electrode. Not specifically defined, the type of the liquid-crystal cell is preferably a TN (twisted nematic) type, an STN (super-twisted nematic) type, a HAN (hybrid aligned nematic) type, a VA (vertically alignment) type, an ECB (electrically controlled birefringence) type, an OCB (optically compensatory bent) type, an IPS (in-plane switching) type, or a CPA (continuous pinwheel alignment) type.

<Electronic Paper>

The gas barrier film of the invention can be used in an electronic paper. The electronic paper is a reflection-type electronic display capable of attaining a high precision and a high contrast.

The electronic paper has a display media and a TFT driving the display media on a substrate. Any known display media can be used in the electronic paper. For example, any display media of electophoretic-type, electopowder flight-type, charged tonner-type, electrochromic type can be preferably used. Among them, electophoretic display media is more preferable and microcapsule-type electophoretic display media is particularly preferable. The electophoretic display media has a plural number of capsules and each capsule has at least one particle capable of moving in a suspension flow. The at least one particle is preferably an electrophoretic particle or a spinning ball. The electrophretic display media has a first plane and a second plane that are placed in parallel, and an image is displayed through one of the two planes.

A TFT formed on a substrate comprises a gate electrode, gate insulating layer, an active layer, a source electrode and a drain electrode. A TFT also comprises a resistance layer between the active layer and the source electrode and/or between the active layer and the drain electrode to attain electric connection.

When a color display with a high precision is produced, TFT's are preferably formed on a color filter to precisely align them. Normal TFT with a low electric efficiency can not be down-sized much while obtaining the necessary driving current, and when a high precision display is pursued, the rate of the area for the TFT in a pixel must be high. When the rate of the area for the TFT is high, the rate of the opening area and contrast are low.

Even when a transparent amorphous IGZO-type TFT is used, light transmittance is not 100% and reduction of contrast is unavoidable. Use of the TFT disclosed in JP-A 2009-21554 and the like can reduce the rate of the TFT in a pixel and improve the rate of the opening area and contrast. High precision can also be attained by forming this type of TFT on a color filter directly.

(Others)

Other applications of the invention are thin-film transistors as in JP-T H10-512104, and touch panels as in JP-A 5-127822, 2002-48913.

(Optical Member)

An example of the optical member that comprises the barrier laminate of the present invention is a circular polarizer.

(Circular Polarizer)

Laminating a gas barrier film of the invention with a λ/4 plate and a polarizer gives a circular polarizer. In this case, the components are so laminated that the slow axis of the λ/4 plate could cross the absorption axis of the polarizer at an angle of 45°. The polarizer is preferably stretched in the direction of 45° from the machine direction (MD) thereof; and for example, those described in JP-A 2002-865554 are favorably used.

(Solar Cell)

The gas barrier film of the invention can be used also as a sealing film for solar cell devices. Preferably, the gas barrier film of the invention is used for sealing a solar cell device in such a manner that its adhesive layer is on the side near to the solar cell device. The solar cell devices for which the gas barrier film of the invention is favorably used are not specifically defined. For example, they include single crystal silicon-based solar cell devices, polycrystalline silicon-based solar cell devices, single-junction or tandem-structure amorphous silicon-based solar cell devices, gallium-arsenic (GaAs), indium-phosphorus (InP) or the like III-V Group compound semiconductor-based solar cell devices, cadmium-tellurium (CdTe) or the like II-VI Group compound semiconductor-based solar cell devices, copper/indium/selenium (CIS-based), copper/indium/gallium/selenium (CIGS-based), copper/indium/gallium/selenium/sulfur (CIGSS-based) or the like I-III-VI Group compound semiconductor-based solar cell devices, dye-sensitized solar cell devices, organic solar cell devices, etc. Above all, in the invention, the solar cell devices are preferably copper/indium/selenium (CIS-based), copper/indium/gallium/selenium (CIGS-based), copper/indium/gallium/selenium/sulfur (CIGSS-based) or the like I-III-VI Group compound semiconductor-based solar cell devices.

EXAMPLES

The characteristics of the present invention are described more concretely with reference to the following Examples. In the following Examples, the material used, its amount and the ratio, the details of the treatment and the treatment process may be suitably modified or changed not overstepping the spirit and the scope of the present invention. Accordingly, the present invention should not be limitatively interpreted by the Examples mentioned below.

[Formation of a Gas Barrier Film 1]

On a substrate (manufactured by DuPont, Teonex Q65FA, having a thickness of 100 μm), each composition consisting of polymerizable compounds shown in the following table (the total amount of 14 weight parts), a polymerization initiator (Chiba Speciality Chemicals, IRGACURE907, 1 weight parts), and 2-butanone (185 weight parts) was coated by a wire bar coating method, and then cured through irradiation with UV rays at a dose of 0.5 J/cm$^2$ in atmosphere having 100 ppm of oxygen, thereby producing an organic layer. The thickness of the formed organic layer is shown below. Then, aluminum oxide was deposited on the surface of the formed organic layer according to a vacuum sputtering method (reactive sputtering) to form a layer having thickness of 40 nm, thereby producing a gas barrier film, Each gas barrier film obtained was tested and evaluated for barrier property (water vapor permeability) and adhesiveness according to the methods below.

[Water Vapor Permeability]

The water vapor permeability (g/m$^2$/day) was measured according to the method described in G. NISATO, P. C. P. BOUTEN, P. J. SLIKKERVEER, et al.; SID Conference Record of the International Display Research Conference 1435-1438. The measure was carried out at 40° C. and 90% RH. The results are shown in the following table.

[Adhesiveness]

In order to evaluate adhesiveness of each gas barrier film, cross-cut adhesiveness test compliant to JIS K5400 was carried out. The surface of the gas barrier film having the above construction was cut in at the entering angle of 90 degree toward the film surface at 1 mm interval, thereby producing one hundred of cross-cut at 1 mm interval. On the surface thereof, Mylar tape having the wide of 2 cm (manufactured by Nitto Denko, polyester tape, No. 31B) was attached, and then was peeled off using a tape peeling testing machine. The number (n) of the remaining grids which didn't peel off from one hundred of cross-cut on the laminated film was counted. The results are shown by %.

TABLE 1

| | Organic layer | | | | | |
| | Polymerizable compound 1 | | Polymerizable compound 2 | | | Water vapor | |
| | Species | Mixture ratio | Species | Mixture ratio | Thickness (nm) | permeability (g/m$^2$/day) | Adhesiveness (n) |
| --- | --- | --- | --- | --- | --- | --- | --- |
| Comparative Example 1 | A-2 | 100 | — | — | 500 | 0.0057 | 75 |
| Example 1 | A-2 | 93 | B-3 | 7 | 500 | 0.0019 | 82 |
| Example 2 | A-2 | 85 | B-3 | 15 | 500 | 0.0007 | 85 |
| Comparative Example 2 | A-2 | 85 | B-3 | 15 | 1200 | 0.0065 | 0 |
| Comparative Example 3 | A-2 | 85 | B-3 | 15 | 200 | 0.0098 | 90 |
| Comparative Example 4 | A-2 | 85 | B-3 | 15 | 4000 | 0.0066 | 0 |
| Example 3 | A-2 | 70 | B-3 | 30 | 500 | 0.0009 | 85 |
| Example 4 | A-2 | 60 | B-3 | 40 | 500 | 0.0012 | 88 |
| Example 5 | A-1 | 60 | B-1 | 40 | 500 | 0.0033 | 80 |
| Example 6 | A-2 | 85 | B-1 | 15 | 500 | 0.0030 | 90 |
| Example 7 | A-2 | 85 | B-2 | 15 | 500 | 0.0010 | 87 |
| Example 8 | A-3 | 85 | B-3 | 15 | 500 | 0.0003 | 87 |
| Example 9 | A-2 C-1 | 80 5 | B-3 | 15 | 500 | 0.0004 | 100 |
| Example 10 | A-2 | 85 | B-4 | 15 | 500 | 0.0009 | 91 |
| Example 11 | A-2 | 85 | B-5 | 15 | 500 | 0.0006 | 92 |
| Example 12 | A-2 | 85 | B-6 | 15 | 500 | 0.0025 | 75 |

In the above table, the mixture ratio of the polymerizable compound 1 and polumerizable compound 2 is represented by weight ratio (%). The polymerizable compounds used in the above table are shown below.

Compound A-1 manufactured by Daicel-cytec company Ltd., EBECRYL-600;

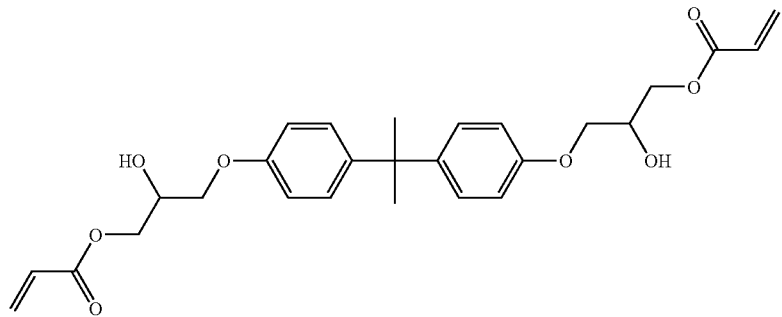 [SMILES: C=CC(=O)OCC(O)COc1ccc(C(C)(C)c2ccc(OCC(O)COC(=O)C=C)cc2)cc1]

Compound A-2 manufactured by Shin-nakamura Chemical Corporation, NK ester, ABE-300:

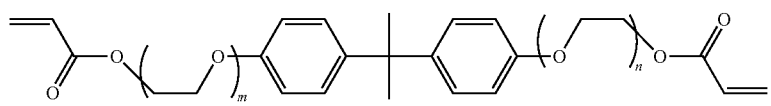

$m + n = 3$ (Average value)

Compound A-3 manufactured by Shin-nakamura Chemical Corporation, NK ester, ABE-BPEF:

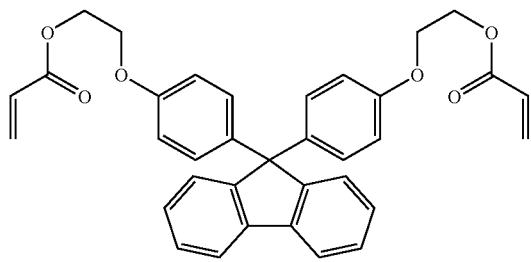 [SMILES: C=CC(=O)OCCOc1ccc(C2(c3ccc(OCCOC(=O)C=C)cc3)c3ccccc3-c3ccccc32)cc1]

Compound B-1 manufactured by Daicel-cytec company Ltd., TMPTA (Molecular weight=296.1, acryl equivalent weight=98.7):

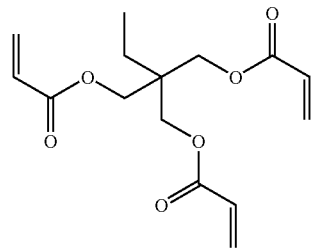 [SMILES: C=CC(=O)OCC(CC)(COC(=O)C=C)COC(=O)C=C]

Compound B-2 manufactured by Daicel-cytec company Ltd., EBECRYL 140 (Molecular weight=466.5, acryl equivalent weight=116.6):

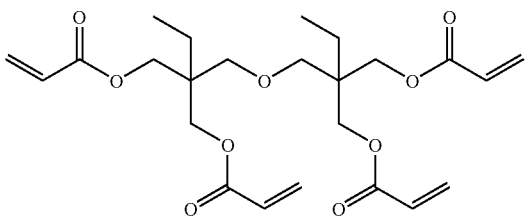 [SMILES: C=CC(=O)OCC(CC)(COCC(CC)(COC(=O)C=C)COC(=O)C=C)COC(=O)C=C]

Compound B-3 manufactured by NIPPON KAYAKU CO., Ltd., DPCA-20 (Molecular weight=806.9, acryl equivalent weight=134.5):

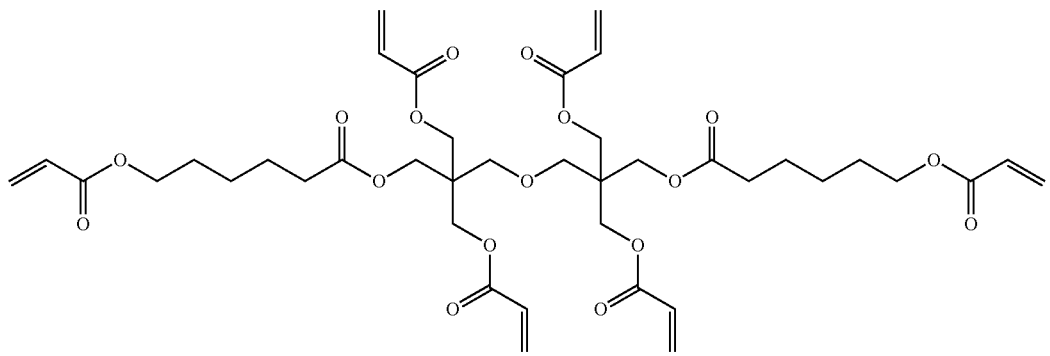 [SMILES: C=CC(=O)OCCCCCC(=O)OCC(COCC(COC(=O)C=C)(COC(=O)C=C)COC(=O)CCCCCOC(=O)C=C)(COC(=O)C=C)COC(=O)C=C]

Compound B-4 manufactured by Kyoeisha chemical CO., Ltd. (Molecular weight=268.4, acryl equivalent weight=134.2);

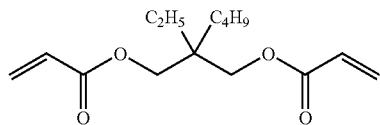

Compound B-5 manufactured by Daicel-cytec company Ltd., IPR=214K (Molecular weight=304.4, acryl equivalent weight=152.2):

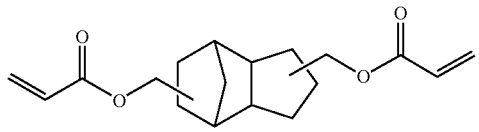

Compound B-6 manufactured by Toagosei Co., Ltd., ARONIX M-360 (Molecular weight=560.4, acryl equivalent weight=186.8):

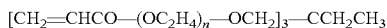

n is equal to about 2.
Compound C-1:

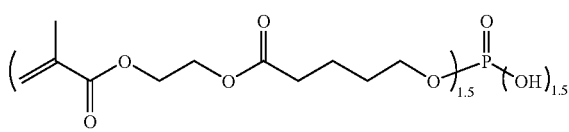

As is clear from the table, the gas barrier film of the present invention is excellent in barrier property and adhesiveness. For example, Example 2 and Comparative Examples 2 to 4 use the same composition but have a different thicknesses. From those, it is found that approximately single digit enhancement of water vapor permeability is achieved by setting the layer thickness to the range of the present invention.

From comparison between Examples 5, 6 and 12 and the other Examples, it is found that, by employing a multifunctional (meth)acrylate having acryl equivalent weight of 110 to 180, the water vapor permeability is enhanced by 2 to 10 times.

In addition, it was found that, by adding the acidic monomer C-1, the adhesiveness is enhanced.

Since U.S. Pat. No. 6,413,645 fails to disclose the specific composition of monomers used in its Example, direct comparison between Example in U.S. Pat. No. 6,413,645 and the Examples of the present invention is impossible to do, but it is clear that the gas barrier film of the present invention has much higher barrier property. This is clear from difference of achievement level of barrier property in the case where the gas barrier film having one inorganic layer of the present invention is compared with the gas barrier film having one barrier layer as an inorganic layer of U.S. Pat. No. 6,413,645.
[Formation of a Gas Barrier Film 2]

A gas barrier film was formed in the same manner as the above Example 9 in the above formation of a gas barrier film 1, however, $Al_2O_3$ as the inorganic layer was changed to the inorganic layer shown in Table 2

TABLE 2

| | Inorganic layer | | Water vapor | |
| | Species | Thickness (nm) | permeability (g/m$^2$/day) | Adhesiveness (n) |
| --- | --- | --- | --- | --- |
| Example 16 | SiO$_2$ | 40 | 0.0025 | 80 |
| Example 17 | Si$_3$N$_4$ | 40 | 0.0017 | 82 |

From the results of Table 2, it was found that the gas barrier film having the organic layer of the present invention and the inorganic layer of oxidized silicon or silicon nitride achieves excellent barrier property.
[Formation of a Gas Barrier Film 3]

On a substrate (manufactured by DuPont, Teonex Q65FA, having a thickness of 100 μm), a gas barrier film was formed in the same manner as those of Examples 2 to 11 in the formation of a gas barrier film 1, and then the same organic layer and the same inorganic layer were formed in that order, thereby obtaining a gas barrier film having a constitution of substrate/organic layer/inorganic layer/organic layer/inorganic layer (Examples 18 to 27).

The obtained gas barrier film was measured according to the same method as that in the above formation of a gas barrier film 1. All Examples 18 to 27 showed a similar tendency to those in the above formation of a gas barrier film 1.
[Formation of a Gas Barrier Film 4]

Gas barrier films were formed in the same manner as in Examples 2 to 11, respectively, except that the polymerization initiator (Chiba Speciality Chemicals, IRGACURE907) was changed to a polymerization initiator (Lambertis, Ezacure KTO46). The water vapor permeability for the obtained gas barrier films were evaluated according to the same manner as in Formation of a gas barrier film 1, then they exhibited similar tendencies.

[Evaluation in Organic EL Device]

In order to evaluate gas barrier property, an organic EL device in which vapor or oxygen causes dark spot was formed. An ITO film-having conductive glass substrate (surface resistivity, 10 Ω/square) was washed with 2-propanol, and then processed for UV ozone treatment for 10 minutes. On the substrate (anode), the following compound layers were formed in order by vapor deposition according to a vacuum vapor deposition method.

(First Hole Transporting Layer)
Copper phthalocyanine: film thickness 10 nm.
(Second Hole Transporting Layer)
N,N'-diphenyl-N,N'-dinaphthylbenzidine: film thickness 40 nm.
(Light-Emitting Layer Also Serving as Electron Transporting Layer)
Tris(8-hydroxyquinolinato)aluminium: film thickness 60 nm.
(Electron Injection Layer)
Lithium fluoride: film thickness 1 nm.

Aluminium was formed on it through vapor deposition to form a cathode having a thickness of 100 nm, and a silicon nitride film having a thickness of 3 μm was formed thereon according to a parallel plate CVD method, thereby constructing an organic EL device.

Next, using a thermosetting adhesive (Epotec 310, by Daizo-Nichimori), each gas barrier film formed in the above formation of a gas barrier film 3 (Examples 18 to 27) and the organic EL device were stuck together in such a manner that the side of the barrier layer could be on the side of the organic EL device, and heated at 65° C. for 3 hours to cure the adhesive. 10 test pieces of every sample of the thus-sealed organic EL device were prepared.

Just after produced, the organic EL device was tested for light emission under application of 7 V thereto, using a source measure unit (SMU2400 Model by Keithley). Using a microscope, the light-emitting surface was observed, which confirmed uniform light emission by every device with no dark spot.

Finally, the devices were stored in a dark room at 60° C. and 90% RH for 300 hours, and then tested for light emission. In all of 10 devices, dark spots larger than 200 μm in diameter were not observed, and it was found that the devices of the present invention were excellent in weather resistance.

INDUSTRIAL APPLICABILITY

Since the gas barrier film of the present invent invention has high barrier property, it is possible to use widely for various devices in which its barrier property is desired. Since the organic layer in the gas barrier film of the present invention makes it possible to enhance the smoothness of the organic layer, the inorganic layer having a smooth surface is also able to be provided. As the result, the present invention makes it possible to enhance the smoothness of the outermost surface, thereby enhancing properties of devices which are provided on the gas barrier film. Further, the gas barrier film of the present invention is extremely advantageous from viewpoints that it can achieve high barrier property even if it is produced through plasma process.

The present disclosure relates to the subject matter contained in Japanese Patent Application No. 167146/2008 filed on Jun. 26, 2008, and Japanese Patent Application No. 148484/2009 filed on Jun. 23, 2009, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A barrier laminate comprising at least one organic layer and at least one inorganic layer, wherein the organic layer has a thickness of 500 nm and is formed by curing a polymerizable composition comprising an aromatic (meth)acrylate represented by the following formula (1) and a multifunctional (meth)acrylate having an acryl equivalent weight of not more than 200:

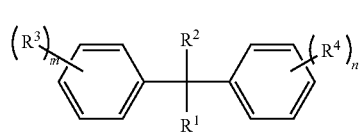

formula (1)

wherein $R^1$ and $R^2$ each are a hydrogen atom, an alkyl group, or an aryl group, $R^1$ and $R^2$ may bond with each other to form a ring; $R^3$ and $R^4$ each are a substituent; m and n each are an integer of 0 to 5; when m is not less than 2, each $R^3$ may be the same or different, and when n is not less than 2, each $R^4$ may be the same or different; and at least two of $R^3$ and $R^4$ have a (meth)acryloyloxy group.

2. The barrier laminate according to claim 1, wherein the formula (1) is represented by the following formula (2):

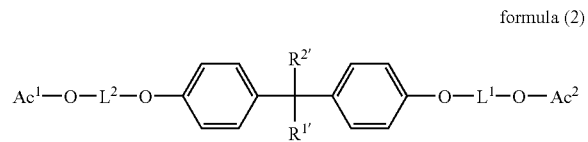

formula (2)

wherein $R^{1'}$ and $R^{2'}$ each are a hydrogen atom, an alkyl group, or an aryl group; $L^1$ and $L^2$ each are a linking group; $Ac^1$ and $Ac^2$ each are an acryloyl group, or a (meth)acryloyl group.

3. The barrier laminate according to claim 1, wherein the multifunctional (meth)acrylate having an acryl equivalent weight of not more than 200 has an acryl equivalent weight of 110 to 180.

4. The barrier laminate according to claim 1, wherein the multifunctional (meth)acrylate having an acryl equivalent weight of not more than 200 has 2 to 6 (meth)acryloyloxy groups.

5. The barrier laminate according to claim 1, wherein the polymerizable composition further comprises an acid monomer.

6. The barrier laminate according to claim 1, wherein the polymerizable composition further comprises a compound represented by the following formula (P):

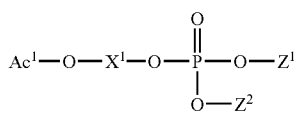
formula (P)

wherein $Z^1$ represents $Ac^2$—O—$X^2$—, a substituent not having a polymerizable group, or a hydrogen atom; $Z^2$ represents $Ac^3$—O—$X^3$—, a substituent not having a polymerizable group, or a hydrogen atom; $Ac^1$, $Ac^2$ and $Ac^3$ each represent an acryloyl group, or a (meth)acryloyl group; $X^1$, $X^2$ and $X^3$ each represent a divalent linking group.

7. The barrier laminate according to claim 6, wherein the polymerizable composition comprises 5 to 20% by weight of the compound represented by the formula (P).

8. The barrier laminate according to claim 1, wherein the polymerizable composition comprises 70 to 90% by weight of the aromatic (meth)acrylate represented by the formula (1) and 10 to 30% by weight of the multifunctional (meth)acrylate having an acryl equivalent weight of not more than 200.

9. The barrier laminate according to claim 1, wherein the aromatic (meth)acrylate represented by the formula (1) has a molecular weight of 300 to 1000.

10. The barrier laminate according to claim 1, wherein the inorganic layer comprises an oxide containing aluminium and/or silicon, or a nitride containing aluminium and/or silicon.

11. The barrier laminate according to claim 6, comprising at least two organic layers, wherein each of the at least two organic layers has a thickness of 500 nm.

12. The barrier laminate according to claim 1, wherein at least two organic layers and at least two inorganic layers are laminated alternately, and the at least two organic layers have the same composition.

13. The barrier laminate according to claim 6, wherein at least two organic layers and at least two inorganic layers are laminated alternately, and the at least two organic layers have the same composition.

14. The barrier laminate according to claim 1, wherein at least two organic layers and at least two inorganic layers are laminated alternately, and each of the at least two organic layers has a thickness of 500 nm.

15. The barrier laminate according to claim 6, wherein at least two organic layers and at least two inorganic layers are laminated alternately, and each of the at least two organic layers has a thickness of 500 nm.

16. The barrier laminate according to claim 1, wherein the aromatic (meth)acrylate represented by formula (1) is at least one compound selected from the group consisting of Compound A-1, Compound A-2, and Compound A-3, and wherein the multifunctional (meth)acrylate having an acryl equivalent weight of not more than 200 is at least one compound selected from the group consisting of Compound B-1, Compound B-2, Compound B-3, Compound B-4, Compound B-5, and Compound B-6:

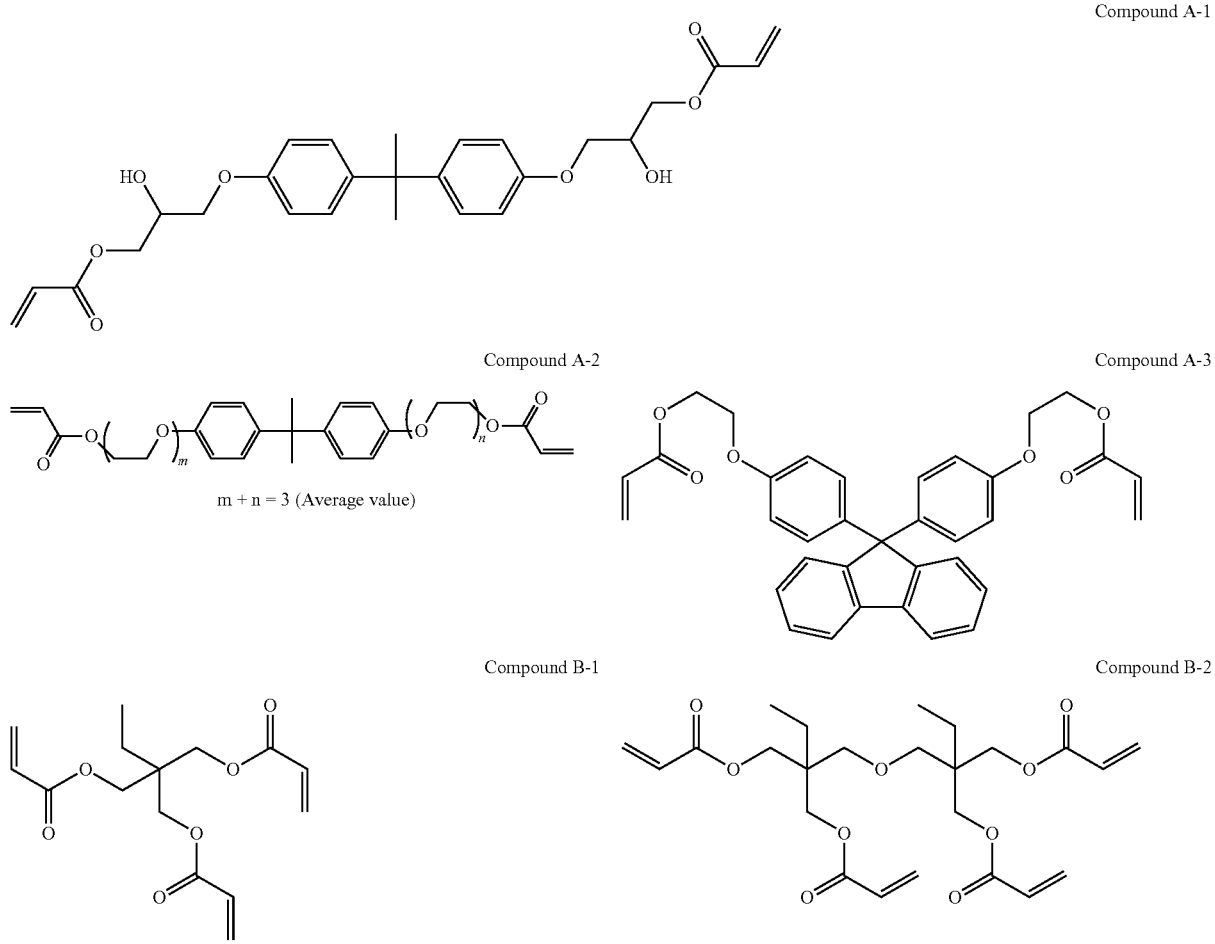

-continued

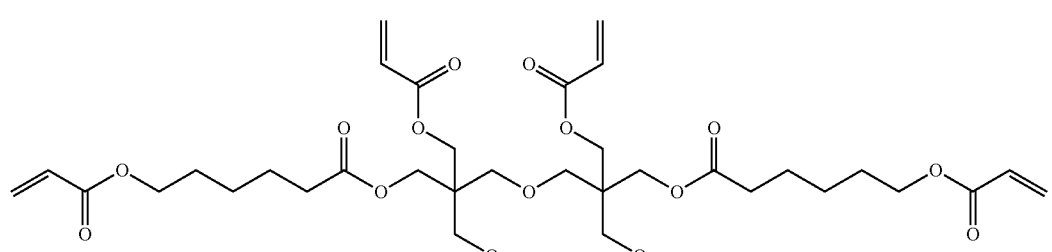

Compound B-3

Compound B-4

Compound B-5

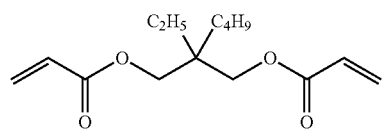

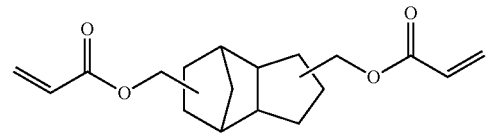

Compound B-6

[CH$_2$=CHCO—(OC$_2$H$_4$)$_n$—OCH$_2$]$_3$—CCH$_2$CH$_3$ wherein the value of n in Compound B-6 is 2.

17. The barrier laminate according to claim 16, wherein the polymerizable composition comprises 70 to 90% by weight of the aromatic (meth)acrylate represented by formula (1) and 10 to 30% by weight of the multifunctional (meth)acrylate having an acryl equivalent weight of not more than 200.

18. The barrier laminate according to claim 16, wherein the organic layer has a thickness of 500 nm, and wherein the polymerizable composition comprises 70 to 90% by weight of the aromatic (meth)acrylate represented by formula (1) and 10 to 30% by weight of the multifunctional (meth)acrylate having an acryl equivalent weight of not more than 200.

* * * * *